E. STEIN.
WINDOW SCREEN.
APPLICATION FILED APR. 7, 1913.
1,104,151.
Patented July 21, 1914.
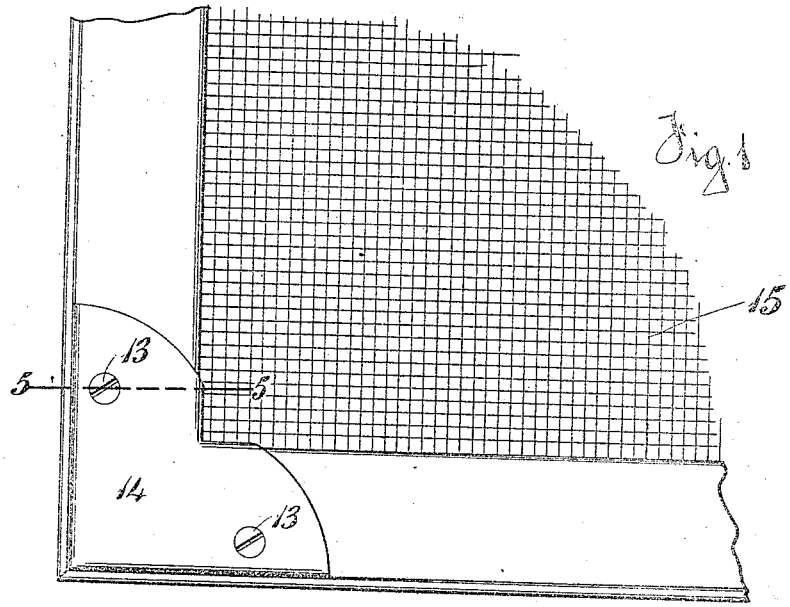
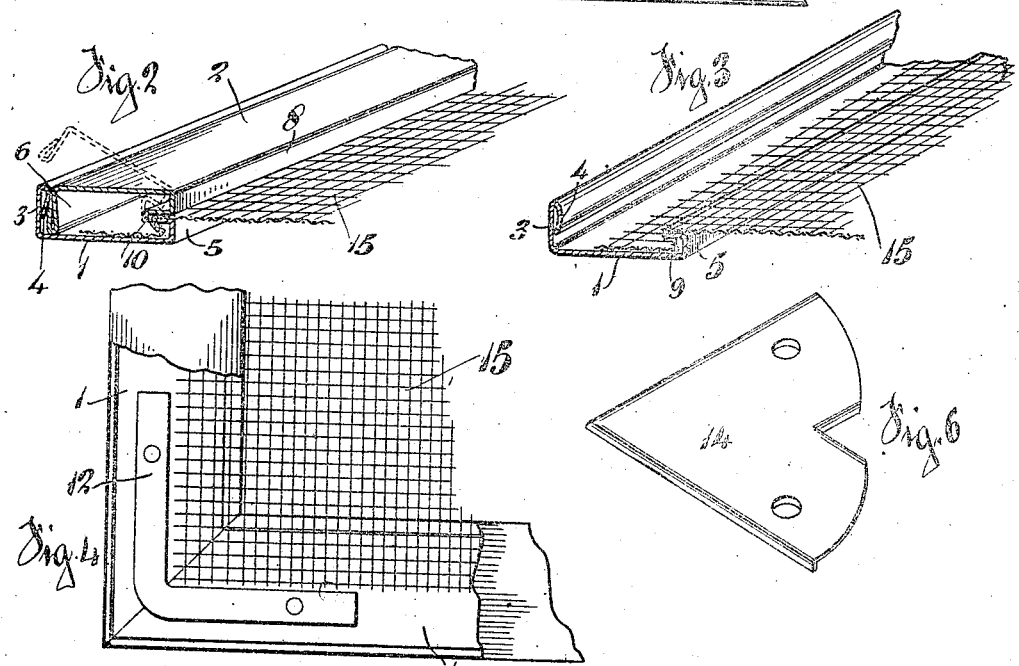
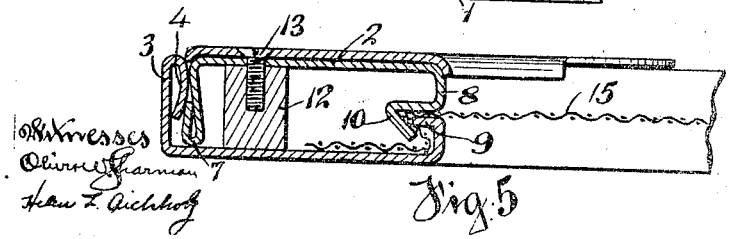

UNITED STATES PATENT OFFICE.

EDWARD STEIN, OF NEWPORT, KENTUCKY, ASSIGNOR TO THE HIGGIN MANUFACTURING COMPANY, OF NEWPORT, KENTUCKY, A CORPORATION OF WEST VIRGINIA.

WINDOW-SCREEN.

1,104,151.     Specification of Letters Patent.     Patented July 21, 1914.

Application filed April 7, 1913. Serial No. 759,817.

*To all whom it may concern:*

Be it known that I, EDWARD STEIN, a citizen of the United States, and a resident of the city of Newport, in the county of Campbell and State of Kentucky, have invented certain new and useful Improvements in Window-Screens, of which the following is a full, clear, and exact description, reference being had to the accompanying drawings, forming part of this specification.

My invention relates to window screens with metal frames, and the object of the invention is to provide a strong and durable framework which can be readily and easily put together for any desired size of screen, and in which the molding is so constructed that the framework can be readily and easily taken apart for rewiring whenever the screening becomes damaged and worn.

The invention consists of that certain novel construction and arrangement of parts to be hereinafter particularly pointed out and claimed, in which the molding is formed in two sections adapted to clamp and hold the screening rigidly in place at the same time that the two sections may be readily locked together, to be easily opened up when desired.

In the drawings, Figure 1 is a plan view of one corner of my improved window screen. Fig. 2 is a perspective cross section of a portion of the screen, showing the parts locked together. Fig. 3 is a similar perspective view with the locking section of the molding removed. Fig. 4 is a plan view of one of the corners broken away to show the interior construction. Fig. 5 is a cross section taken on the line 5, 5, of Fig. 1. Fig. 6 is a perspective view of one of the corner plates.

The molding frame for holding the wire mesh for the screen is constructed of two half sections, a body section 1 and a locking section 2. The body section is turned up at right angles to form the outer face 3 of the molding and then bent back on itself to form a flat bead 4. On the inner edge, the body section is turned up at right angles to form substantially half of the inner wall of the molding 5. The locking section 2 is also turned over at right angles to form a wall 6, to correspond to the outer face 3, and the lower edge of the portion 6 is formed into a bead 7 adapted when the two sections are brought together to spring past the bead 4 on the body section. The inner edge of the locking section is also turned over at right angles to form the inner face 8 and with the portion 5 of the other section to form the inner face of the molding. The lower portion 5 is turned over at right angles to form a lip 9, and the corresponding portion of the locking section is also turned over at right angles and bent downwardly to form a hook 10.

The sides and ends of the complete molding making up the frame are beveled to fit together at the corners and for each corner a solid angle piece 12 is employed to stiffen and support the frame. Each angle piece is preferably riveted to the body section 1, and screws 13, 13, are provided for securing the locking sections. To form a proper finish, a cover plate 14 is also provided for each corner, the outer edge of which is turned over slightly to fit down between two sections of the molding.

To make up the frame for the wire mesh, the body portions are fitted together and riveted to the angle pieces 12 at the corners so as to form a substantial framework. The wire mesh 15 is then stretched over the lip 9 along one side and the proper locking section 2 is then located in place as indicated by the dotted lines in Fig. 2, the hook portion 10 being first caused to engage the lip and the wire mesh and then the locking section is pressed down causing the bead 7 to spring past the bead 4. The wire mesh is then drawn tightly on this side, the other sections of the frame are located in place in the same way, and then the corner plates 14 are secured in place by the screws 13. In this way a solid and substantial frame is provided, and it will be evident that by unscrewing the cover plates 14 the locking sections can be easily sprung from place for the renewal of the wire mesh.

Having thus described my invention, what I claim as new and desire to secure by Letters Patent, is:—

1. In a window screen, a frame divided lengthwise into separable sections, means for locking together the outer edge of the two sections, the inner portions of the sections bent at right angles to form flat faces in opposition to each other between which the screening is grasped, a reëntering lip on the inner edge of one section, and a hook lengthwise of the corresponding inner edge of the other section with the wire mesh locked between said hook and lip.

2. In a window screen, a frame divided lengthwise into separable sections, the one adapted to fit inside of the end walls to lock behind each other, the inner portions of the sections bent at right angles to form flat faces in opposition to each other between which the screening is grasped, with a re-entering lip on the inner edge of one section and a hook lengthwise of the corresponding inner edge of the other section with the wire mesh locked between said hook and lip.

3. In a window screen, a frame divided lengthwise into a body section and a locking section, with angle irons located between the two sections at the corners to lock together the body section to form a frame, the two sections having corresponding beads in their outer edges to lock together with the inner edges of the two sections having a coöperating tongue and groove with the wire mesh locked between said tongue and groove, and with corner plates engaging over said beads and means for securing said corner plates to the angle irons to form a rigid and substantial frame.

EDWARD STEIN.

Attest:
HENRY A. FABER,
HELEN L. AICHHOLZ.